(12) United States Patent
Scott et al.

(10) Patent No.: US 6,372,350 B1
(45) Date of Patent: Apr. 16, 2002

(54) CURABLE EPOXY-BASED COMPOSITIONS

(75) Inventors: Edward Scott, Templeogue; Brendan Kneafsey, Lucan, both of (IR)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/594,714

(22) Filed: Jun. 16, 2000

(51) Int. Cl.⁷ .................................................. B32B 27/38
(52) U.S. Cl. ..................... 428/413; 428/414; 523/454
(58) Field of Search ..................... 523/454; 428/413, 428/414

(56) References Cited

U.S. PATENT DOCUMENTS

| | | | |
|---|---|---|---|
| 4,225,691 A | * | 9/1980 | Crivello ...................... 526/192 |
| 4,238,587 A | | 12/1980 | Crivello ...................... 526/192 |
| 4,275,190 A | | 6/1981 | Dudgeon ..................... 528/361 |
| 4,404,355 A | * | 9/1983 | Eldin et al. ................... 518/89 |

FOREIGN PATENT DOCUMENTS

WO   WO 98/33645   6/1998   ........... B32B/15/06

OTHER PUBLICATIONS

J. V. Crivello et al, "Diaryliodonium Salts as Thermal Initiators of Cationic Polymerization", Journal of Polymer Science, vol. 21, 97–109 (1985).

* cited by examiner

Primary Examiner—Robert Dawson
Assistant Examiner—D. Aylward
(74) Attorney, Agent, or Firm—Steven C. Bauman

(57) ABSTRACT

The present invention relates to epoxy compositions; in particular the present invention relates to stable low temperature curing epoxy-based compositions.

28 Claims, 7 Drawing Sheets

CURABLE EPOXY-BASED COMPOSITIONS

FIELD OF THE INVENTION

The present invention relates to epoxy compositions; in particular the present invention relates to stable low temperature curing epoxy-based compositions.

BACKGROUND OF THE INVENTION

U.S. Pat. No. 4,225,691 (Crivello) describes a low temperature curable organic resin composition. The composition comprises a cationically polymerisable organic resin and a catalyst which has three components: a diaryliodonium salt, a copper salt and a reducing agent. Diaryliodonium salts are known as photoinitiators for cationic polymerisations. However Crivello, in his paper published in Journal of Polymer Science: Polymer Chemistry, Vol. 21, 97–109 (1983), reports that diaryliodonium salts undergo efficient thermal decomposition in the presence of copper(II) compounds. The '691 patent (U.S. Pat. No. 4,225,691) discloses that compositions comprising a diaryliodonium salt employed with a catalyst comprising a mixture of a copper salt and a reducing agent can effect the cure of a cationically polymerisable organic material, such as an epoxy resin, spontaneously, or within a few minutes, without the use of external heat and under atmospheric conditions. The compositions must be stored in two parts for storage stability. Such compositions are known to those skilled in the art as two-part compositions.

U.S. Pat. No. 4,238,587 (also to Crivello) describes curable compositions comprising (i) a cationically polymerizable organic material, (ii) a diaryliodonium salt and (iii) a copper chelate or a mixture of a copper chelate and a reducing agent. The diaryliodonium salts are described as being effective thermal initiators for the polymerisation of cationically polymerisable materials such as epoxides, cyclic ethers and phenol-formaldehyde resins.

The compositions described in the '691 and '587 patents are suited for storage as two-part compositions due to the almost immediate cure of compositions containing the two parts mixed together. Combining the two parts of Crivello result in compositions which are very unstable at room temperature.

Developments to this technology have been proposed; for example WO 98/33645 (Ghosal) describes an epoxy resin composition containing particulate filler, a base resin comprising a polyepoxy resin, a cycloaliphatic epoxy-functional siloxane, an iodonium salt, a copper compound and optionally a toughener. The compositions are described as addressing the poor shelf life, high modulus, and slow cure of prior art epoxy resin compositions and are said to be useful as die-attach adhesives, polymer bumps, underfill encapsulants, and glob-top encapsulants.

U.S. Pat. No. 4,275,190 (Dudgeon) describes stabilising epoxy resin compositions catalyzed with combinations of diaryliodonium salts of complex halogenides and copper salt catalyst stabilized at room temperature by including an effective amount of a carboxyl-terminated copolymer of butadiene and acrylonitrile, or a hydroxy-terminated copolymer of butadiene and acrylonitrile or mixtures thereof. The compositions are described as being fully activatable at elevated temperatures.

It is desirable to provide a stable, low to moderate temperature curing, epoxy-based composition, which is suitable for formulation as a one-part composition.

SUMMARY OF THE INVENTION

Surprisingly it has been found that a curable one-part epoxy-based composition comprising;

(a) a polymerisable cycloaliphatic epoxy compound; and
(b) a diaryliodonium salt; and
(c) a salt or complex of copper, is stable at room temperature, as compared to the prior art compositions of Crivello which are unstable and cure rapidly at room temperature. The compositions comprising (a), (b) and (c) above are curable by exposure to temperatures of about 70° C. to about 100° C. such as 80° C. to about 100° C. The composition is suitable for formulation as a one-part composition.

The compositions of the invention are useful in particular chip bonding and in bonding of electronic components generally and in general bonding and marking applications described in more detail below.

Furthermore it has also surprisingly been discovered that addition of a component (d) an aromatic diketone shows improved stability as compared to a composition of components (a) to (c).

An alternative (or additional) stabiliser component (e) a nitroxyl free radical stabiliser may be added to a composition of components (a) to (c) above (and optionally component (d)) to stabilise the composition. Component (e) provides additional stability.

A component (f) a β-diketone may also be used (as an additional or alternative stabiliser to component (d) and/or component (e)) to stabilise the composition.

The composition may have added one or more of components (d), (e) and (f).

It has also been discovered by the present inventors that a composition comprising components (a) to (c) and at least one of components (d), (e) or (f) may additionally comprise component (g) an α-hydroxy ketone. Previously one-part epoxy compositions containing an α-hydroxy ketone were found to be curable with rapid cure at room temperature. The compositions of the present invention are storage stable and are heat activatable at moderate temperatures such as those in the range of about 70° C. to about 100° C. such as about 80° C. to about 100° C.

It has been found that compositions comprising components (a) to (c) and in addition one or more of components (d), (e), (f) and (g), and in particular compositions comprising each of components (a) to (g), have highly desirable properties—being storage stable and yet remain curable at temperatures in the range of about 80° C. to about 100° C.

The compositions given above are suitable for formulation as one-part compositions, in the presence or absence or air.

A convenient and expedient method of curing compositions of the present invention is to expose the composition to heated air so as to effect cure.

A further component (h) a dye may be added to any of the compositions described above without adversely affecting the stability of the composition. The dye can be used to import a desired colour to the composition.

1(i) cycloaliphatic epoxy, diaryliodonium hexafluoroantimonate, Cu(II) naphthenate and ascorbic acid palmitate;

1(ii) cycloaliphatic epoxy, diaryliodonium hexafluoroantimonate, Cu(II) naphthenate, ascorbic acid palmitate and naphthaquinone;

1(iii) cycloaliphatic epoxy, diaryliodonium hexafluoroantimonate and Cu(II) naphthenate.

Figure 1:
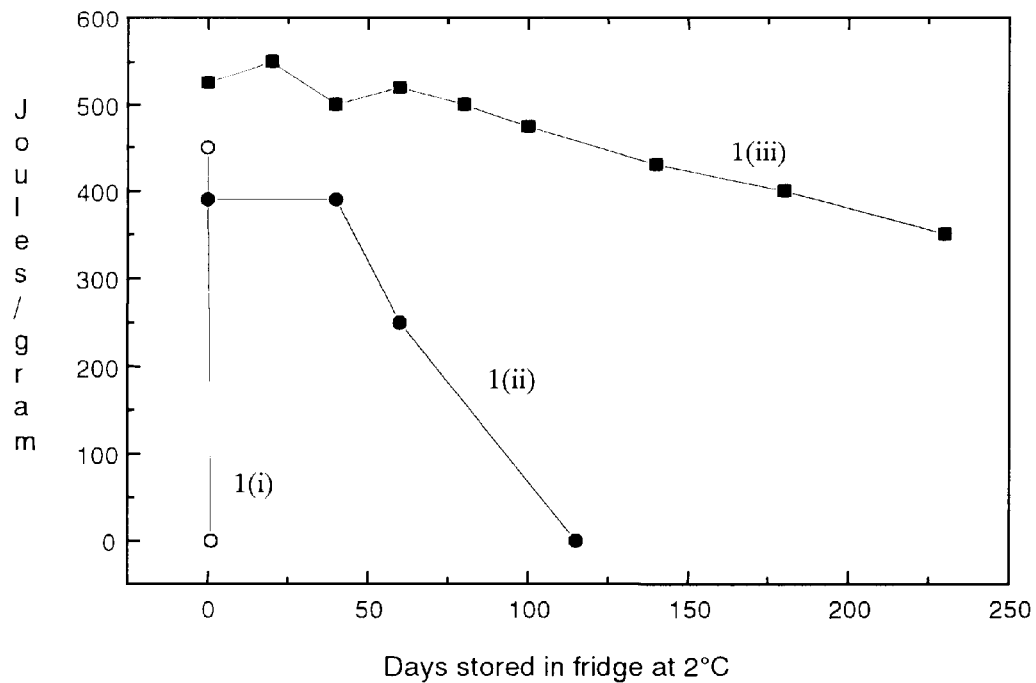
FIG. 1 shows a plot of an exotherm measured for compositions containing.
Figure 2:
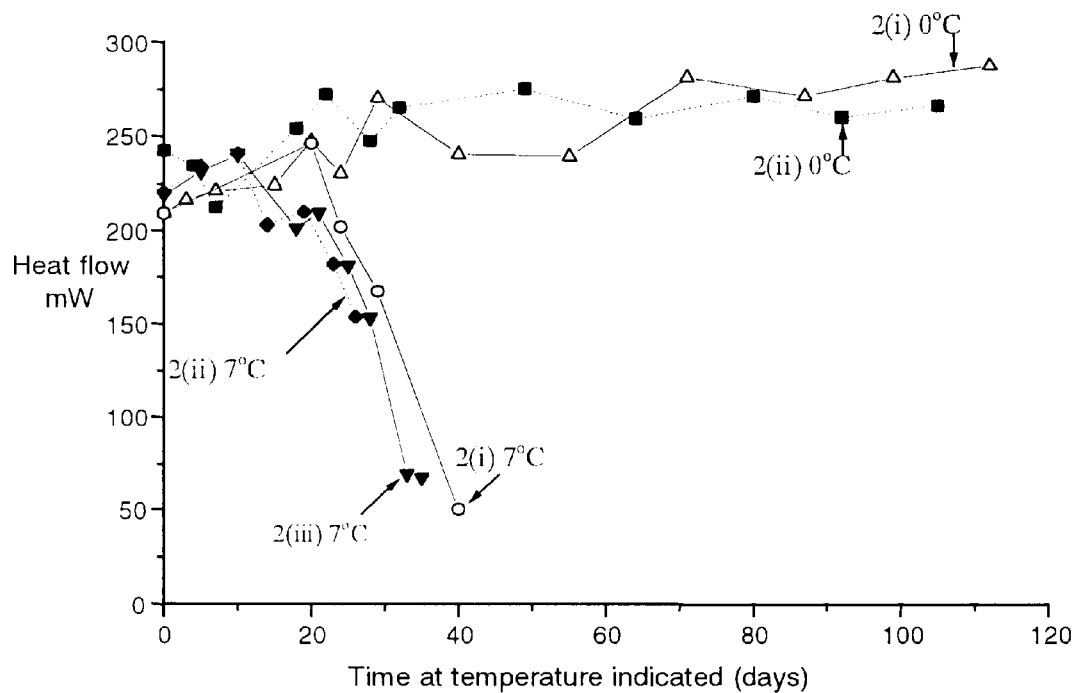

FIG. 2 shows a plot of heat flow versus storage time (at an indicated temperature) for compositions containing (indicated) different amounts of acetylacetone and/or TEMPO stored for indicated times at indicated temperatures. The compositions contain in addition to the components of composition 1(i) of FIG. 1:

2(i) 4% by weight acetylacetone based on the weight of the composition;

2(ii) 2% by weight acetylacetone based on the weight of the composition;

2(iii) 2% by weigh acetylacetone based on the weight of the composition and 0.1% by weight TEMPO based on the weight of the composition.

Compositions 2(i) and 2(ii) were stored at 0° C. and 7° C. Composition 2(iii) was stored at 7° C.

Figure 3:
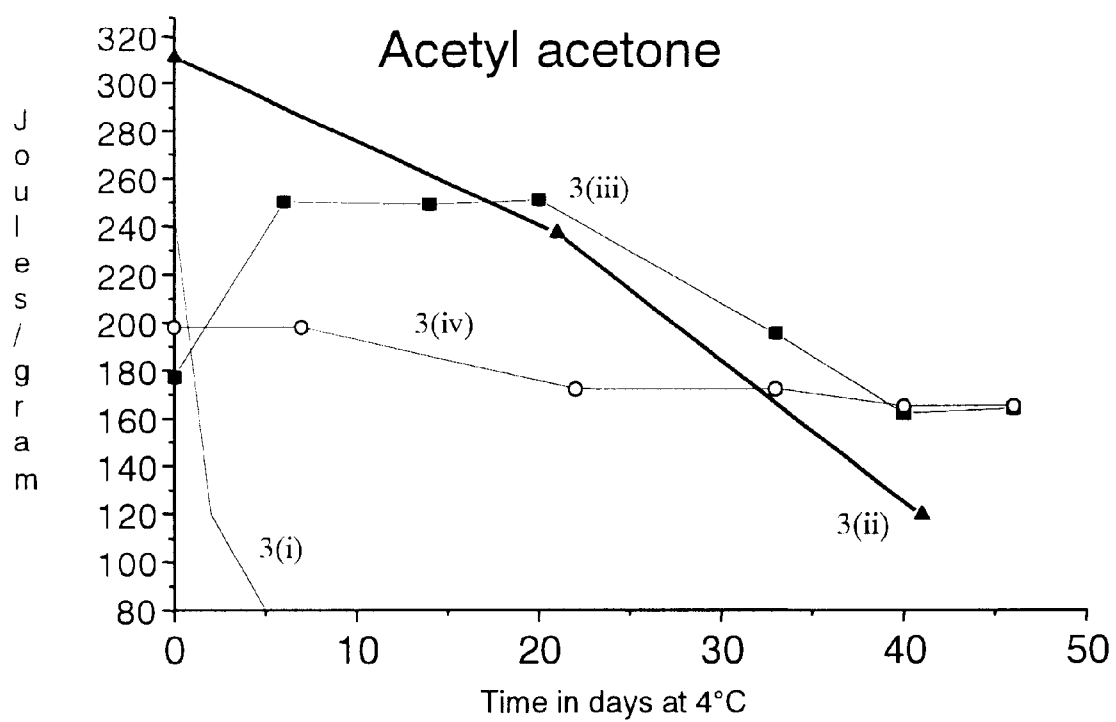

FIG. 3 shows an exotherm measured for the following compositions (where the amounts of components present are expressed as percentages by weight based upon the total weight of the composition):

3(i) 2% ascorbic acid palmitate, 2% diaryliodonium hexafluoroantimonate and 2% copper naphthenate in a 5% silica thickened cycloaliphatic epoxy matrix (control formulation);

3(ii) Composition 3(i) plus 2% acetylacetone;

3(iii) Composition 3(ii) plus 0.1% 1,4-naphthaquinone,

3(iv) Composition 3(ii) plus 0.1% TEMPO.

Figure 4:
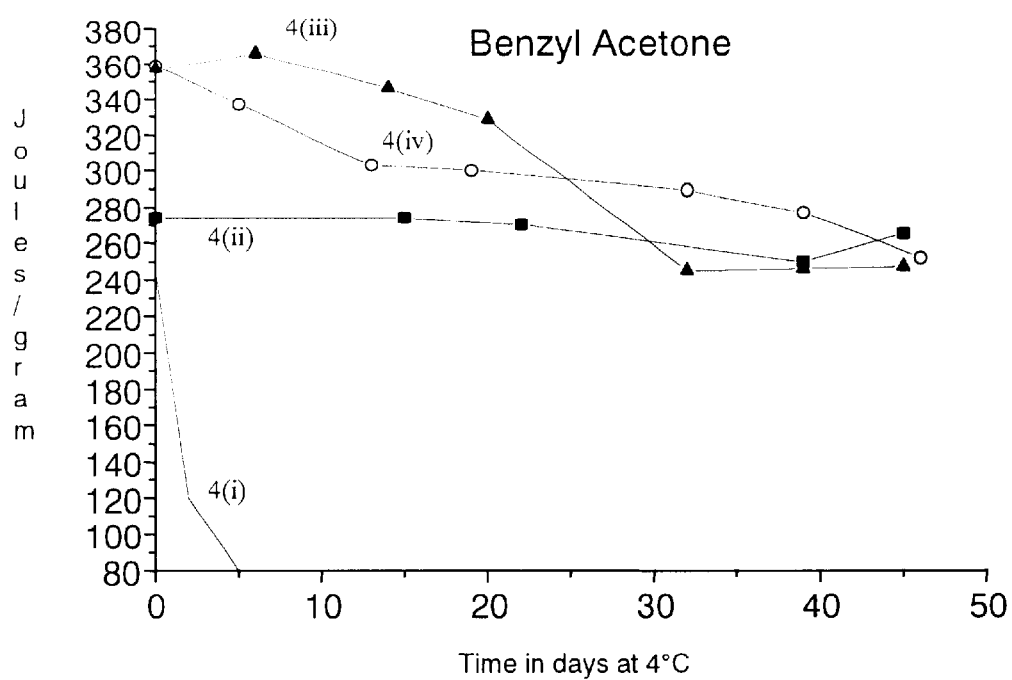

FIG. 4 shows an exotherm measured for the following compositions (where the amounts of components present are expressed as percentages by weight based upon the total weight of the composition):

4(i) 2% ascorbic acid palmitate, 2% diaryliodonium hexafluoroantimonate and 2% copper naphthenate in a 5% silica thickened cycloaliphatic epoxy matrix (control formulation);

4(ii) Composition 4(i) plus 2% benzoylacetone;

4(iii) Composition 4(ii) plus 0.1% 1,4-naphthaquinone;

4(iv) Composition 4(ii) plus 0.1% TEMPO.

Figure 5:
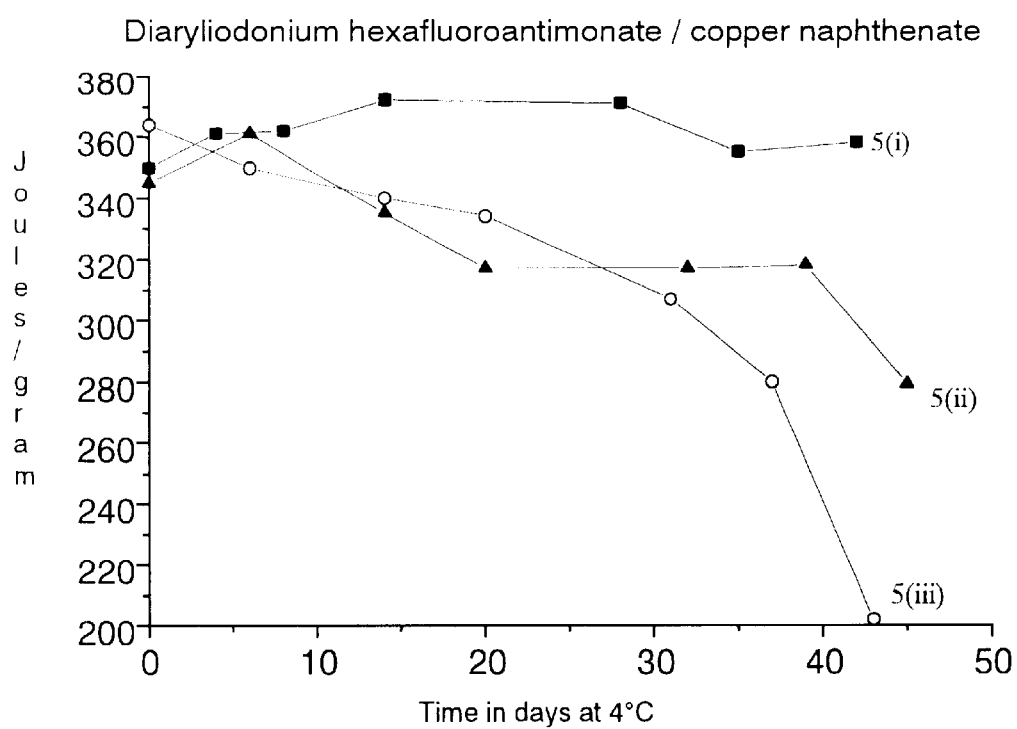

FIG. 5 shows an exotherm measured for the following compositions (where the amounts of components present are expressed as percentages by weight based upon the total weight of the composition):

5(i) 2% diaryliodonium hexafluoroantimonate and 2% copper naphthenate in a 5% silica thickened cycloaliphatic epoxy matrix (control formulation);

5(ii) Composition 5(i) plus 0.1% 1,4-naphthaquinone;

5(iii) Composition 5(i) plus 0.1% TEMPO.

Figure 6:
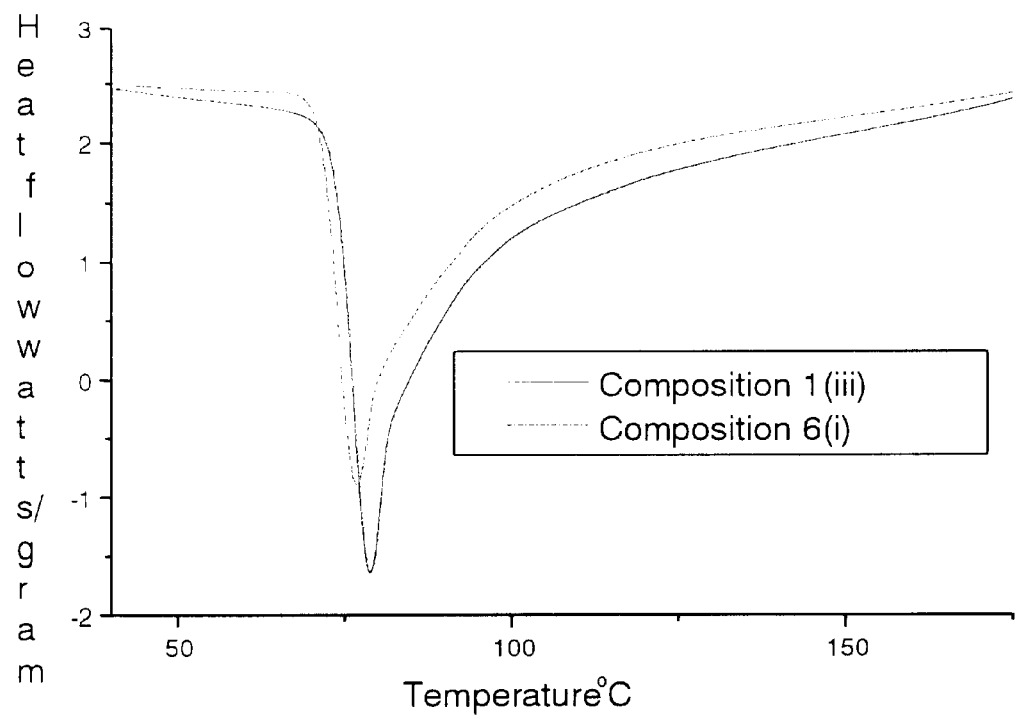

FIG. 6 shows an exotherm measured for composition 6(i) which had the same components as composition 1 (iii) [See reference to FIG. 1 above] plus 0.013% w/w based on the total weight of the composition of the dye Basic Red 29 (discussed below). FIG. 6 also includes an exotherm for composition 1(iii) for comparative purposes.

Figure 7:
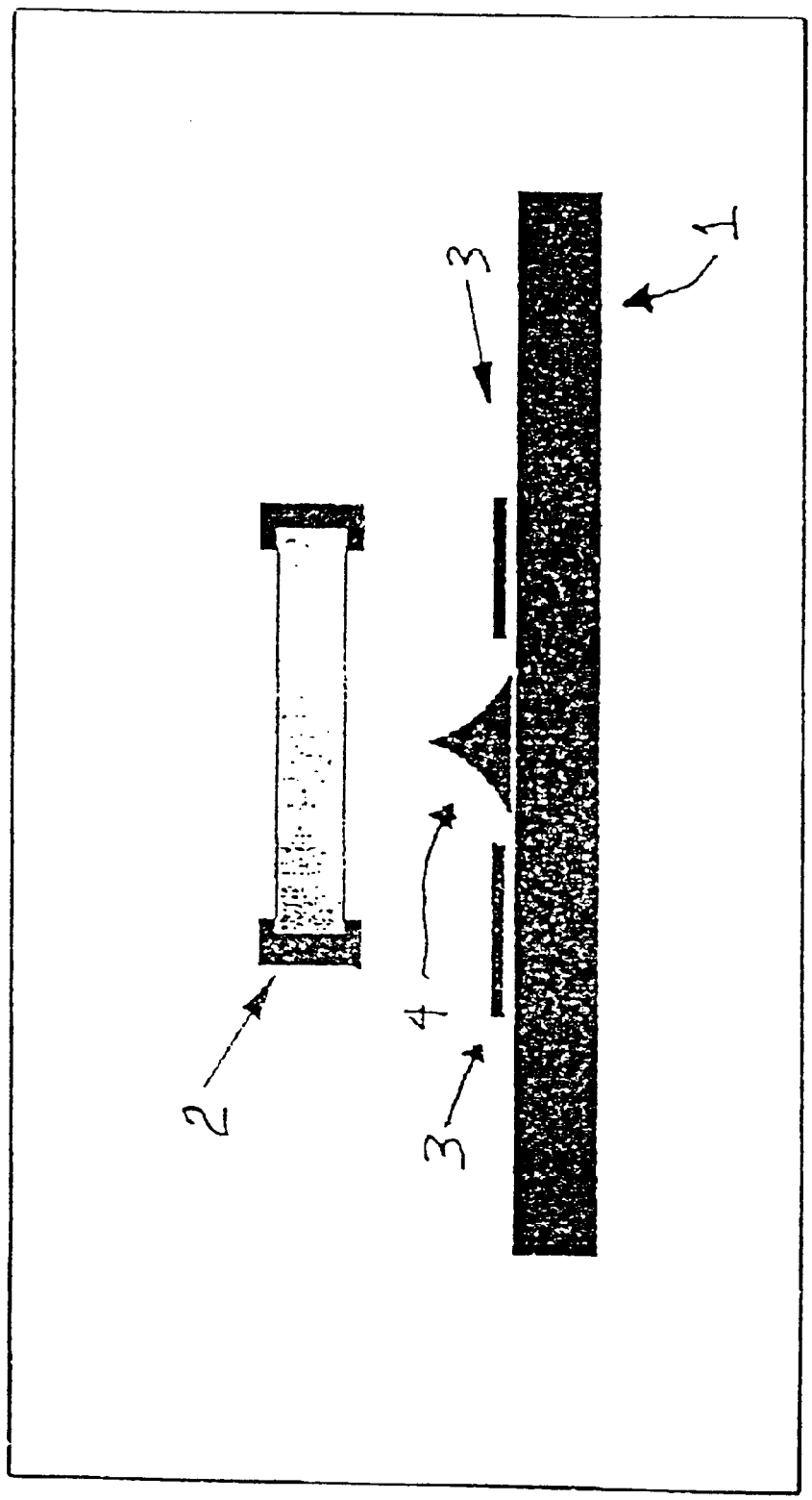
Figure 8:
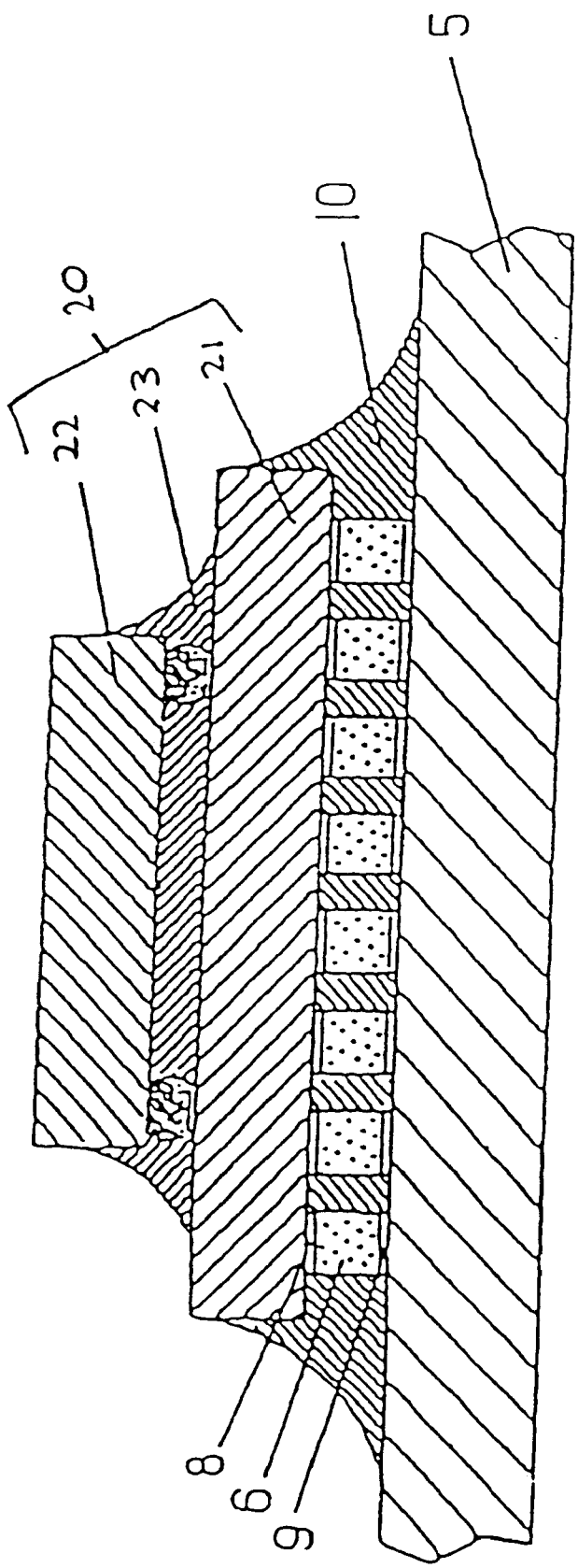

FIG. 7 is a schematic diagram depicting in an exploded view epoxy resin compositions of the present invention in use to bond a semiconductor chip to a pcb;

FIG. 8 is a schematic diagram depicting compositions in accordance with this invention in use to bond a semiconductor chip to a pcb, between which has been dispensed an underfill sealant.

DETAILED DESCRIPTION OF THE INVENTION

End-use Applications of Compositions of the Invention:

The epoxy compositions of the present invention are appropriate for use in any conventional application of epoxy compositions, such as adhesive or coating agents. They may be used in the electronics industry generally, including the microelectronics industry. One commercial use of epoxy compositions is to bond a surface mounted device ("smd") such as a semiconductor to a pcb in a chip bonding application. A method of using a composition of the invention to achieve such a result typically includes the steps of: (i) dispensing onto an appropriate location on a carrier substrate a sufficient amount of the composition, (ii) positioning over the location bearing the composition an electronic component, (iii) mating the electronic component with the carrier substrate, and (iv) exposing the mated electronic component/carrier substrate assembly to conditions favourable to effect cure of the composition.

Another commercial use is as an underfill sealant to seal the space between a semiconductor device electrically connected to a circuit board. The epoxy-based compositions of the invention are suitable for this purpose.

A method of underfilling a space between an electronic component and a carrier substrate, the electronic component being mounted on the carrier substrate, typically includes the step of dispensing an amount of an epoxy composition according to the present invention into the space between the electronic component and the carrier substrate, and exposing the epoxy composition to conditions which effect cure of the composition.

In use, the epoxy compositions of the present invention may be applied to a substrate in any conventional fashion. Suitable application modes include syringe dispensing, pin-transfer, screen printing, and through other conventional adhesive dispensing equipment.

Reference to FIG. 7 shows a mounted structure on which an epoxy composition 4 according to the invention, has been dispensed onto a carrier substrate 1 (e.g., a pcb) between the solder lands 3. The semiconductor chip 2 is positioned over the location of the carrier substrate 1 onto which the epoxy composition 4 has been dispensed, and the carrier substrate and semiconductor substrate are thereafter mated. FIG. 7 shows the epoxy composition 4 having been dispensed onto the carrier substrate 1. In certain instances it may be desirable to apply the composition onto the semiconductor chip 2 instead, or apply the composition onto both the carrier substrate 1 and the semiconductor chip 2.

The epoxy composition is then exposed to conditions appropriate to effect cure so as to bond together the carrier substrate and the semiconductor chip. Ordinarily, those conditions include a heat cure mechanism.

In order to improve reliability, the space between the semiconductor chip 2 and the carrier substrate 1 may be suitably sealed with an underfill sealant 10 which may be an epoxy composition of the present invention. (See FIG. 8 and the description below). The epoxy compositions of the present invention may be used in conjunction with, or instead of, conventional underfill sealants such as any of those commercially available from Loctite Corporation, including Loctite product number 3150. The cured product of the underfill sealant should completely fill that space.

Carrier substrates may be constructed from ceramic substrates of $Al_2O_3$, $SiN_3$ and mullite ($Al_2O_3$—$SiO_2$); substrates or tapes of heat-resistant resins, such as polyimides; glass-reinforced epoxy; ABS and phenolic substrates which are also used commonly as circuit boards; and the like. In FIGS. 7 and 8, the solder lands are depicted as the electrical connection means.

In the arrangement of FIG. 8 the semiconductor device 20 is one formed by connecting a semiconductor chip (so-called bare chip) 22, such as LSI, to a carrier substrate 21 using an epoxy composition of the invention and sealing the space therebetween suitably with epoxy composition 23. This semiconductor device is mounted at a predetermined position of the circuit board 5, and electrodes 8 and 9 are electrically connected by a suitable connection means such as solder. In order to improve reliability, the space between carrier substrate 21 and circuit board 5 is sealed with an underfill sealant which is the cured product 10 of a thermosetting epoxy composition. The cured product 10 of the thermosetting composition need not completely fill the space between carrier substrate 1 and circuit board 5, but may fill it to such an extent as to relieve stresses caused by thermal cycles.

Cured reaction products of the epoxy compositions of the present invention should demonstrate desirable adhesive force, heat resistance and electrical properties, and acceptable mechanical properties, such as chemical resistance, moisture resistance and the like, for the applications for which they are used herein.

The compositions of the invention have also been found to be suitable for marking of ceramic objects, for example tiles. They may be used in bonding any substrate for example plastics, metal, wood etc. The compositions were found to cure rapidly when placed on a ceramic object and cured with heated air. The compositions cure to a dry hard material which resists scratching after a very short length of time. This method of curing the composition is low cost, convenient and rapid, as compared to more traditional cure mechanisms such as an ultra violet cure mechanism. The air is heated to a suitable temperature such that the composition reaches a temperature about 80° C. or higher. In typical applications the composition is exposed to heated air which causes the composition to cure at a temperature most usually in the range from about 70° C. to about 120° C., and often in the range from about 80° C. to about 100° C. The duration for which the composition is exposed to the heated air is typically from about 30 seconds to about 10 minutes, more usually from about 1 minute to about 2 minutes. Component (h) a dye (discussed below) is particularly useful for imparting a desired colour to the composition for marking a substrate.

Discussion of Component (a)—the Polymerisable Cycloaliphatic Epoxy Compound

Component (a) may be selected from cycloaliphatic epoxy compounds having a $C_6$ to $C_{20}$ cycloaliphatic ring. Useful cycloaliphatic epoxy compounds include: 3,4 epoxycyclohexylmethyl 3,4 epoxycyclohexane carboxylate, which is available as ERL-4221 (Union Carbide Corporation trademark) and Araldite CY-179 (Ciba-Geigy trademark); diglycidylester of hexahydrophthalic anhydride which is available as CY-184 (Ciba-Geigy trademark); and bis(3,4-epoxycyclohexylmethyl) adipate, which is available as ERL-4299 (Union Carbide trademark). In general component (a) may be selected from cycloaliphatic epoxide (including diepoxides), bisphenol A diexpoxide or a cycloaliphatic epoxy resin containing ethylenic unsaturation.

Within the epoxy component may be included appropriate reactive diluents which include monofunctional or certain multifunctional epoxy resins. The reactive diluent should have a viscosity which is lower than that of the epoxy compounds within the epoxy component having at least two epoxy groups. Ordinarily, the reactive diluent should have a viscosity less than about 250 mPa.s (cP). In the event such a monofunctional epoxy resin is included within the epoxy component as a reactive diluent, such monofunctional epoxy resin should be employed in an amount of up to about 50 parts by weight based on the total weight of the epoxy resin component.

The monofunctional epoxy resin should have an epoxy group with an alkyl group of about 6 to about 28 carbon atoms, examples of which include $C_6$–$C_{28}$ alkyl glycidyl ethers, $C_6$–$C_{28}$ fatty acid glycidyl esters and $C_6$–$C_{28}$ alkylphenol glycidyl ethers.

Commercially available monofunctional epoxy resin reactive diluents include those from Pacific Epoxy Polymers, Richmond, Mo., under the trade designations PEP-6770 (glycidyl ester of neodecanoic acid), PEP-6740 (phenyl glycidyl ether) and PEP-6741 (butyl glycidyl ether).

Commercially available reactive diluents include those from Pacific Epoxy Polymers, under the trade designations PEP-6752 (trimethylolpropane triglycidyl ether) and PEP-6760 (diglycidyl aniline).

Suitably the epoxy is present in amounts of about 40% to about 95% w/w based on the total weight of the composition for example 40% to about 90%, such as about 45% to about 80% and desirably 50% to about 70%.

Discussion of Component (b) Diaryliodonium Salt

The diaryliodonium salts useful in the present invention include those described by Crivello in U.S. Pat. Nos. 4,255,691 and 4,238,587 and by Ghosal in WO 98/33645 the entire contents of each of which are incorporated herein by reference.

The diaryliodonium salts which are useful in the present invention include those of the formula

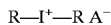

wherein each R is independently a $C_6$–$C_{30}$ aryl radical, each R is optionally substituted one or more times, with one or more of $C_1$–$C_{16}$ alkyl, $C_1$–$C_{16}$ alkoxy, hydroxy, halogen or nitro; and the $C_1$–$C_{16}$ alkyl groups and $C_1$–$C_{16}$ alkoxy are optionally further substituted one or more times by one or more of hydroxy, halogen or nitro.

Suitably each R is independently selected from phenyl, halophenyl such as chlorophenyl and $C_1$–$C_{20}$ alkyl phenyl for example dodecyl phenyl.

A is any suitable counterion (anion). Suitably $A^-$ is one of the common anions such as halogen (particularly $Cl^-$, $Br^-$, $F^-$) or $CF_3SO_3^-$, $C_6H_5SO_3^-$, $NO_3^-$, and $PO_3^-$.

The counterions $A^-$ suited to the compositions of the present invention include anions of the elements: As, Sb, Fe, Sn, Sb, Bi, B, P or N, for example:

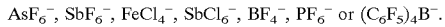

Component (b) may for example be bisdodecyl phenyl iodonium hexafluoroantimonate.

Suitably the diaryliodonium salt is present in amounts front about 0.01% to about 10% w/w based on the total weight of the composition more suitably from about 0.1% to about 5% w/w based on the total weight of the composition and desirably from about 1% to about 3% w/w based on the total weight of the composition.

Discussion of Component (c) a Salt or Complex of Copper

Any salt or complex of copper is useful in the present invention as it is the copper atom itself which can provide the effect of altering the onset temperature of the composition. Some of the useful copper complexes include copper naphthenate, copper acetylacetonate etc. and useful salts include copper stearate, copper palmitate etc. The copper salt should be soluble to an extent in the composition and in particular should be soluble to an extent in component (a) the cycloaliphatic epoxy compound. Suitably the amount of solublised salt or complex of copper is in the range of between about 100 to about 3,000 parts per million, particularly about 200 to about 2000 ppm, more particularly about 1000 to about 1800 ppm and often about 1600 ppm.

Discussion of Component (d) an Aromatic Diketone

Any aromatic diketone is suitable for inclusion in the present invention. For convenience of manufacture of the compositions of the present invention commercially available aromatic diketones may be used. Such commercially available aromatic diketones include quinones such as hydroquinones and naphthaquinones (e.g. 1,2-naphthaquinone and 1,4-naphthaquinone).

Suitably the aromatic diketone is present in amounts from about 0.01% to about 10% w/w based on the total weight of the composition more suitably from about 0.1% to about 5% w/w based on the total weight of the composition and desirably from about 1% to about 3% w/w based on the total weight of the composition.

Discussion of Component (e) a Nitroxyl Free Radical Stabiliser

Nitroxyl free radical stabilisers are described in our co-pending International application no. PCT/IE99/00095 filed on Sep. 16, 1999, the entire contents of which are incorporated herein by reference. The inclusion of a nitroxyl free radical stabiliser gives unexpected storage stability with retention of air activatability. The use of a nitroxyl free radical stabiliser is of particular value in combination with a beta-diketone.

In compositions of the invention containing a nitroxyl free radical stabiliser, an aldehyde may be used as a latent acid instead of having a free acid present in the composition. The aldehyde is auto-oxidisable to yield an acid in situ. The aldehyde may suitably be present in an amount of 1–5% by weight of the composition.

Examples of the nitroxyl compounds useful in the composition of the invention are described in "Free Nitroxyl Radicals" by E. G. Rozantsev, translated by B. J. Hazzard, published by Plenum Press, 1970 and in U.S. Pat. Nos 3,692,975 and 5,196,589 and the references cited therein, the contents of all of which are incorporated herein by reference. U.S. Pat. No 3,682,875 describes "stable nitroxide free radicals" which are defined as any nitroxide free radical which shows no appreciable decomposition at room temperature or which has a sufficiently low rate of deterioration or decomposition in the composition such that its effectiveness as an inhibitor of free radical polymerisation will remain over a reasonable period of time, such as from about three to six months or longer. To achieve utility in this regard, the nitroxide free radical should possess a half life of one month or longer in the composition.

A thorough discussion of nitroxide free radicals, and particularly those which can be prepared in relatively stable form can be found in Forrester A. R. et al., "Organic Chemistry of Stable Free Radicals", Academic Press, London and New York (1968), as well as in, for example, British Patent Nos. GB 1,127,127 and GB 1,145,470. Basically, as defined in U.S. Pat. No. 3,682,875, the nitroxide free radical is a compound containing the group >N—O⁻. The stability of the free radical is determined primarily by the nature of the two nitrogen substituents.

As a general rule, in the stable nitroxyl free radicals used in the compositions herein, each nitrogen substituent is an organic radical containing up to about 20 or more carbon atoms. In the preponderance of stable nitroxyl free radicals, each substituent is an alkyl or aryl hydrocarbon group. The above definition is intended to include all substituted alkyl or aryl groups wherein the substituents do not adversely affect the nitroxyl free radical for its intended purpose herein.

Suitable stable nitroxyl free radicals are those having the following general formula:

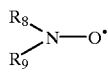

$R_8$ and $R_9$ each being organic radicals wherein the atoms adjacent the nitrogen atom are carbon, and said carbon atoms contain no hydrogen substituents. While some relatively stable nitroxide free radicals have been reported wherein one of the carbon atoms in the alpha position relative to the nitrogen atom did contain a hydrogen atom, it is believed that in nearly all cases the presence of an alpha hydrogen will lead to disproportionation reactions between nitroxide free radical molecules, and hence relatively rapid decomposition. Substituents on the alpha carbon can be, for example, $C_1$–$C_6$ alkyl or alkenyl, halogen, $C_2$–$C_6$ aryl or thioaryl, cyanide, —C(O)NH$_2$, thiophenyl and —C(O)OR$^3$ where $R^3$ is a $C_1$–$C_{12}$ alkyl or aryl.

Common stable nitroxyl free radicals are those wherein $R_8$ and $R_9$ together with the nitrogen atom of the nitroxyl group form a heterocyclic ring, e.g.

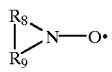

or $R_8$ and $R_9$ are each selected from the group consisting of tertiary alkyl and aryl groups, each of $R_8$ and $R_9$ containing up to about 20 carbon atoms, and most desirably up to about 12 carbon atoms. When both of $R_8$ and $R_9$ are tertiary alkyl, the most highly preferred compound is ditertiary-butyl nitroxide. Generally it is preferable, when either or both $R_8$ and $R_9$ are aryl groups, that the para position of each aryl group be substituted since the presence of an accessible hydrogen atom in a para position of the aryl group has been found to be a common source of instability of the nitroxide free radical. When the aryl group is not para substituted, the instability can be reduced by (a) di-meta substitution or (b) mono- or di-ortho substitution. In all cases, the above substituents can be any substituent which serves to stabilize the nitroxide free radical; however, alkyl, alkoxy and nitro groups have been reported as suitable.

The following are typical examples of stable nitroxide free radicals which can be used in the compositions of the present invention: di-t-butyl nitroxide; 2,2,6,6-tetramethylpiperidine-1-oxyl; 4,4'-dimethoxydiphenyl nitroxide, 2,2',6,6'-tetramethoxydiphenyl nitroxide; t-butyl-4-nitrophenyl nitroxide; t-butyl-3,5-dimethylphenyl nitroxide; and t-butyl-2,6-dimethoxyphenyl nitroxide.

When $R^8$ and $R^9$ together with the nitrogen atom of the nitroxide group form a heterocyclic ring, it may suitably be a 5- or 6-membered heterocyclic ring which may optionally contain a second hetero atom in addition to the nitrogen atom of the nitroxide group and which may optionally be substituted with substituents which do not interfere with the stabilising effect of the nitroxide free radical.

Suitably the nitroxide free radicals may be of the formula III:

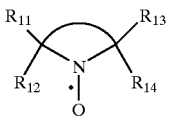

III wherein the line indicating a ring may represent a cycloalkyl or heterocycloalkyl ring which may optionally be substituted, $R_{11}$ and $R_{12}$ which may be the same or different represent $C_1$–$C_6$ alkyl or alkenyl, halogen, $C_2$–$C_6$ aryl or thioaryl, cyanide, —C(O)NH$_2$, thiophenyl and —C(O)OR$^3$ where $R^3$ is a $C_1$–$C_{12}$ alkyl or aryl, and $R_{13}$ and $R_{14}$, which may be the same or different, represent the same substituents, or $R_{13}$ and $R_{14}$ together with the alpha carbon to which they are attached form a bulky organic group.

More particularly the free radicals may be selected from those of the formulae IV or V:

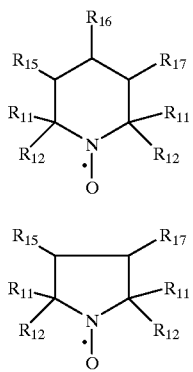

IV

V wherein $R_{11}$ and $R_{12}$ are as defined above; $R_{15}$, $R_{16}$ and $R_{17}$ which may be the same or different, are H, OH, NH$_2$, CN, carboxyl, hydrocarbyl or heterohydrocarbyl groups, which may optionally be substituted, or of the formula VI:

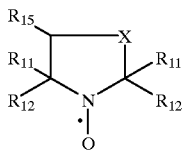

VI wherein X is O or suitably substituted N, for example NH; $R_{11}$ and $R_{12}$ are as defined above; $R_{13}$, $R_{14}$, and $R_{15}$ are as defined above.

In compounds of formula V, $R_{15}$ is suitably H and $R_{17}$ is suitably H or one of the other options defined above for $R_{17}$.

$R_{13}$ and $R_{14}$ and the alpha carbon to which they are attached may suitably be $C_6$ to $C_{30}$ alkyl or fatty acid groups, or may form a ring such as a $C_6$ to $C_{10}$ cycloalkyl ring or a steroid structure. When X is N in formula VI, this N atom may be substituted, for example with $C_1$ to C6 alkyl or oxo.

In the definitions of $R_{15}$, $R_{16}$ and $R_{17}$, the terms "hydrocarbyl", "heterohydrocarbyl" and "substituted" are as defined hereinafter. In compounds of formula IV, $R_{15}$ and $R_{17}$ are suitably H and $R_{16}$ is suitably H or one of the other options defined above for $R_{16}$. The term "hydrocarbyl" as used herein includes (i) straight chain or branched linear or alicyclic aliphatic groups including alkyl, alkenyl and alkynyl, preferably containing from 1 to 20, more preferably from 1 to 10, most preferably from 1 to 5 carbon atoms; and alkylene and alkenylene groups forming part of a ring structure which preferably contains from 3 to 30, more preferably 5 to 20 carbon atoms;

(ii) aromatic groups including aryl, alkaryl and aralkyl groups, preferably containing 6 to 20 atoms, more preferably 6 to 10 carbon atoms, and optionally having a fused ring structure.

The term "heterohydrocarbyl" as used herein includes hydrocarbyl groups as described above interrupted by one or more hetero atoms selected from oxygen, nitrogen or sulphur.

The term "substituted" or "substituted derivative" as used herein includes the appropriate group substituted with one or more oxygen, nitrogen, sulphur or halogen atoms or atom-containing moieties, or with one or more hydrocarbyl, heterohydrocarbyl or silyl groups, which in turn may be substituted with one or more oxygen, nitrogen, sulphur or halogen atoms or atom-containing moieties. Halogen may be chlorine, bromine, fluorine or iodine.

One particularly desirable free radical stabiliser is 2,2,6,6-tetra-methyl-piperidinyloxy (TEMPO) of the formula VII:

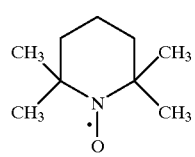

VII and derivatives thereof with substituents $R_{15}$, $R_{16}$ and/or $R_{17}$ as for formula IV, particularly substituents at the 4-position ($R_{16}$) such as 4-amino TEMPO and 4-hydroxy TEMPO.

Other desirable free radical stabilisers include: 2,2,5,5-tetramethyl-pyrrolyloxy free radical (PROXYL) of the formula VIII:

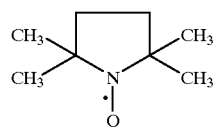

VIII and derivatives thereof substituted with substituents $R_{15}$ and/or $R_{17}$ as indicated for formula V and DOXYL derivatives of the formula IX:

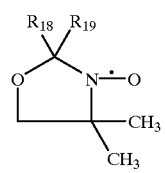

IX wherein $R_{18}$ and $R_{19}$ together with the alpha carbon to which they are attached form a bulky organic group as discussed above for $R_{13}$ and $R_{14}$.

The amount of stable nitroxide free radical used can vary within wide limits, depending upon the specific composition, the specific nitroxide chosen, and the length of time for which the composition is to retain its stability. While as little as 1 part per million by weight, and as much as about one percent by weight can be used, a reasonable general range is between about 10 and about 1000 parts per million by weight of the composition. Suitably, the range is between about 0.0025% and about 0.05% by weight of the composition, particularly 0.01–0.05%.

Discussion of Component (f) the β-diketone

Suitable β-diketone compounds useful in the present invention include those represented by the formula

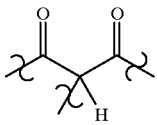

wherein the lines representing unfilled valencies indicate bonds to carbon, hydrogen or hetero atoms.

Hetero atoms may be O.

The β-diketone compounds may be open-chain compounds of the formula

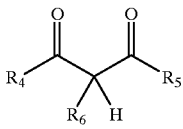

wherein $R_4$ and $R_5$, which may be the same or different, are optionally substituted alkyl, optionally substituted alkoxy or $NR_7R_8$ wherein $R_7$ and $R_8$, which may be the same or different, are optionally substituted alkyl, and $R_6$ is H, optionally substituted alkyl, or optionally substituted alkoxy.

One or both of the carbonyl carbon atoms and optionally the alpha carbon atom form part of a ring selected from alicyclic and heterocyclic rings. The cyclic beta-diketone compounds may be of the formula

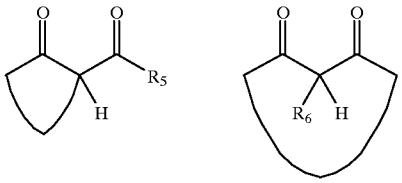

wherein $R_5$ and $R_6$ are as defined above and each of the lines indicating a ring may represent a cycloalkyl or heterocycloalkyl ring which may optionally be substituted. Generally a cycloalkyl or heterocycloalkyl ring may have up to 20 carbon atoms and one or two hetero atoms.

An alkyl or alkoxy group may be straight chain or branched. Suitably an alkyl or alkoxy group may have 1–20, particularly 1–10, especially 1–6 carbon atoms. An alicyclic or heterocyclic ring may suitably be a 5- or 6-membered ring, which may optionally have another alicyclic or heterocyclic ring fused to it with up to 6 members.

The term "substituted" as used herein includes the appropriate group substituted by one or more of oxygen, nitrogen, sulphur or halogen atoms or atom-containing moieties, with the proviso that such groups should not interfere with the polymerisation reactions disclosed in the present application.

A substituted ring may be substituted as in the preceding sentence or may be substituted by optionally substituted alkyl, optionally substituted alkoxy or optionally substituted phenyl.

Halogen may be chlorine, bromine, fluorine or iodine.

Typical example from within the general formula are represented by the illustrative compounds below:

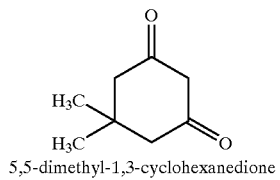

5,5-dimethyl-1,3-cyclohexanedione

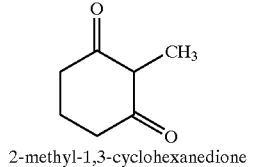

2-methyl-1,3-cyclohexanedione

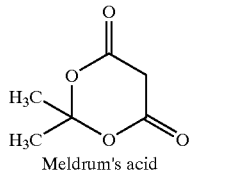

Meldrum's acid

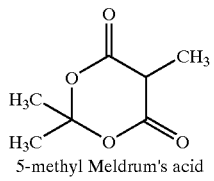

5-methyl Meldrum's acid

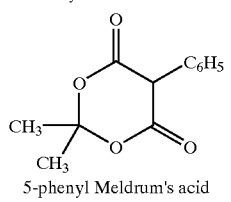

5-phenyl Meldrum's acid

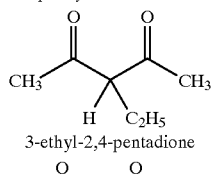

3-ethyl-2,4-pentadione

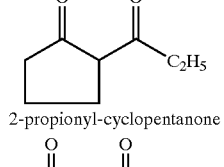

2-propionyl-cyclopentanone

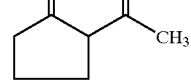

2-acetyl-cyclopentanone

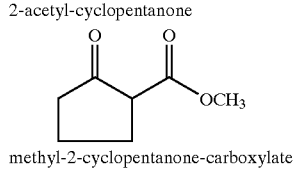

methyl-2-cyclopentanone-carboxylate

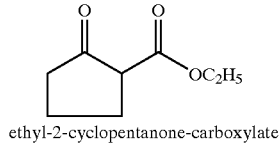

ethyl-2-cyclopentanone-carboxylate

-continued

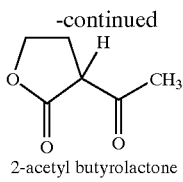

2-acetyl butyrolactone

Other beta-diketone compounds as described in the publication by Von Helmut Brederick et al. cited above, disclosure of which is expressly incorporated herein by reference, may also be used in the compositions of the invention. β-diketones which have been found to be particularly useful in the present invention include acetone derivatives, i.e. compounds containing the group

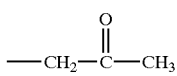

Suitably the acetone derivatives include acetylacetone, (which is commonly referred to as 'acac') and benzoylacetone.

Suitably the β-diketone is present in amounts from about 0.01% to about 10% w/w based on the total weight of the composition, more suitably from about 0.1% to about 5% w/w based on the total weight of the composition and desirably from about 1.0% to about 3% w/w based on the total weight of the composition.

Discussion of Component (g) an α-hydroxy Ketone

Component (g) an α-hydroxy ketone has the function of lowering the onset temperature of cure, which in turn may compromise the storage stability of the composition. The present inventors have discovered that by adding at least one of the components (d) to (f) in addition to component (g) results in a desirable balance between onset temperature and storage stability. The α-hydroxy ketone should be at least partially soluble in the composition.

Suitably the α-hydroxy ketone is of the formula

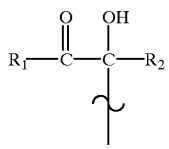

wherein $R_1$ and $R_2$ are independently selected from:
phenyl, phenyl substituted with halogen, OH, $C_1$–$C_4$ alkyl, or $C_1$–$C_4$ alkoxy or a $C_1$–$C_{12}$ alkyl group which is optionally interrupted with one or more hetero atoms such as O, or $C_1$–$C_{12}$ alkenyl which is optionally interrupted with one or more hetero atoms such as O, or $C_1$–$C_{12}$ alkoxy which is optionally interrupted with one or more hetero atoms;
and the extra valence on the α-carbon atom represents a bond to H or a $C_1$–$C_{12}$ alkyl group, or can be taken to be a second bond to $R_2$, i.e. a double bond between the α-carbon and $R_2$; or
$R_1$ and $R_2$ may optionally be further independently substituted one or more times, by one or more of the following: OH, halogen, $C_1$–$C_4$ alkyl or $C_1$–$C_4$ alkoxy; or
$R_1$ and $R_2$ (and optionally the extra valence) may be taken together to form a $C_2$–$C_{12}$ ring optionally interrupted by one or more heteroatoms such as O, N or S, the ring optionally having one or more double bonds, and being optionally substituted one or more times by one or more of: halogen, $C_1$–$C_{12}$ alkoxy or $C_1$–$C_{12}$ alkenyl each of which being optionally further substituted one or more times by one or more of halogen or OH.

One example is 2-hydroxy-1,2-diphenylethanone ("benzoin"). Further examples include 3-hydroxy-2-butanone, alpha-D-glucoheptonic gamma lactone, and 1-hydroxy-2-butanone.

Examples of compounds wherein $R_1$ and $R_2$ are taken together to form a carbocycle include ascorbic acid or derivatives thereof such as those falling within formula I below:

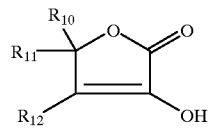

wherein:
$R_{10}$ is selected from H, halogen, or OH, $C_1$–$C_{20}$ alkyl, $C_1$–$C_{20}$ alkoxy, $C_2$–$C_{20}$ alkenyl, or a $C_2$–$C_{12}$ ring optionally interrupted by one or more hetero atoms such as O, N or S;
$R_{11}$ is selected from H, halogen, or OH, $C_1$–$C_{20}$ alkyl, $C_1$–$C_{20}$ alkoxy, $C_2$–$C_{20}$ alkenyl, or a $C_2$–$C_{12}$ ring optionally interrupted by one or more hetero atoms such as O or N or S.
$R_{12}$ is selected from H, halogen, or OH, $C_1$–$C_{20}$ alkyl, $C_1$–$C_{20}$ alkoxy, $C_2$–$C_{20}$ alkenyl, or a $C_2$–$C_{12}$ ring optionally interrupted by one or more hetero atoms such as O or N or S.

In one desirable arrangement component (g) is ascorbic acid, or derivatives thereof, for example ascorbyl palmitate. For example l-ascorbic acid 6-palmitate, ascorbyl oleate, ascorbyl acetate, 5,6-O-isopropylideneascorbic acid, (α-β)-glucooctanoic γ-lactose, α-D-glucoheptanoic γ-lactose, 2-hydroxy-2-phenylacetophenone or 1-hydroxy-2-butanone.

Suitably the α-hydroxy ketone is present in amounts from about 0.01% to about 10% w/w based on the total weight of the composition more suitably from about 0.1% to about 5% w/w based on the total weight of the composition and desirably from about 1% to about 3% w/w based on the total weight of the composition.

Discussion of Component (h)—a Dye

The dyes which are suited for inclusion in the compositions of the invention include "Basic Red 29" below:

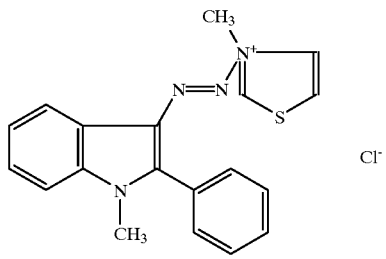

The dye may be chosen for the colour it imparts to the composition, particularly where the application is to mark substrates such as ceramics as described above.

Suitably the dye is present in amounts from about 0.5% to about 20% w/w based on the total weight of the composition more suitably from about 0.75% to about 14% w/w based on the total weight of the composition and desirably from about 1% to about 10% w/w based on the total weight of the composition.

For chip bonding applications it is desirable to use the dye in a range of from about 0.5 to 2.0% w/w based on the total weight of the composition. For other applications such as marking substrates it is desirable to use from about 0.5% to about 10% w/w of the dye.

Additional Components

Any number of conventional additives may also be added to the epoxy resin compositions of the present invention including fillers, thixotropic imparting agents reactive diluents, non-reactive diluents, pigments, flexibilisers, and the like, depending on the intended end use of the composition. Thixotropic imparting agents include in particular silicas and those suited for inclusion in compositions of the present invention include fumed silicas.

While the present invention has been explained above in detail, the following examples illustrate further the benefits and advantages achieved by the inventive compositions. The examples are not intended to limit the scope of the invention in any way.

The words "comprises/comprising" and the words "having/including" when used herein with reference to the present invention are used to specify the presence of stated features, integers, steps or components but does not preclude the presence or addition of one or more other features, integers, steps, components or groups thereof.

General Experimental Procedure

Differential scanning calorimetry (DSC) measurements were made with a Perkin Elmer Pyris 1 analyser. Sample and reference cups were of aluminium. Unless otherwise mentioned the DSC method used follows Internationally recognised procedure ISO 11357-5, in particular Part 5 thereof entitled "Determination of temperature and/or time of reaction kinetics". Typical samples are between 5 and 20 mg. All dynamic measurements were made between 30 and 270 °C. at a rate of temperature increase of 10° C. per minute.

Control compositions consisting of diaryliodonium hexafluoroantimonate and Cu(II) naphthenate in a cycloaliphatic epoxy matrix, filled with hydrophobic fumed silica, were prepared according to the following procedure. To a cycloaliphatic epoxy matrix filled with hydrophobic fumed silica, present in the amount 5% by weight of the composition, was added diaryliodonium hexafluoroantimonate (2% by weight of the composition) followed by Cu(II) naphthenate (2% by weight of the composition). These were stirred until completely mixed. The iodonium salt was UV 9380 a bisdodecyl phenyl iodonium hexafluoroantimonate obtained from GE Silicones, 4600 AC Bergen, OPZOOM, The Netherlands. The copper salt was used as an 8% w/w solution of copper naphthenate in mineral oil, as supplied by Corn Van Loocte N.V., Pathoekeweg 37.8000, Bruge, Belgium. Silica was a fumed hydrophobic Aerosil R 202 supplied by Degussa, Chemi IC-MP-HK, Postfach 13 45, D-63403 Haman, Germany, The epoxy was 3,4-epoxycyclohexylmethyl-3',4'-epoxycyclohexane carboxylate known as UVR 6105 and supplied by Union Carbide, 39 Old Ridgebury Road, Dewbury, Conn., USA.

EXAMPLE 1

Three compositions were prepared according to the General Experimental Procedure above. To one of the compositions, 1(i), was added ascorbic acid palmitate (2% by weight of the composition), while to a second of the compositions, 1(ii), was added ascorbic acid palmitate (2% by weight of the composition) and the stabilizer 1,4-naphthaquinone (0.1% by weight of the composition). Nothing extra was added to the third composition, 1(iii).

Composition 1(i) contained, by weight of the composition, the following components:

2% diaryliodonium hexafluoroantimonate;

2% copper(II) naphthenate and

2% ascorbic acid palmitate made up in a hydrophobic fumed silica thickened (5%) cycloaliphatic epoxy matrix.

Composition 1(ii) contained, by weight of the composition, the following components:

2% diaryllodonium hexatluoroantimonate;

2% copper(II) naphtenate;

2% ascorbic acid palmitate and 0.1% 1,4-naphthaquinone made up in a hydrophobic fumed silica thickened (5%) cycloaliphatic epoxy matrix.

Composition 1(iii) contained, by weight of the composition, the following components:

2% diaryliodonium hexafluoroantimonate and

2% copper(II) naphthenate made up in a hydrophobic fumed silica thickened (5%) cycloaliphatic epoxy matrix.

Results for Example 1

The addition of naphthaquinone [1(ii)] increased storage stability as compared against the control composition [1(i)], though it can be seen that the stability is not as great as a composition not containing ascorbic acid palmitate [1(iii)]. The data is given in FIG. 1. As can be seen from the data for compositions 1(i) and 1(ii) in FIG. 1 the storage life at 2° C. was increased from one hour to over 100 days.

EXAMPLE 2

The following compositions were prepared according to the procedure described in the General Experimental Procedure.

Composition 2(i) contained, by weight of the composition, the following components:

2% diaryliodonium hexafluoroantimonate,

2% copper(II) naphthenate;

2% ascorbic acid palmitate and

4% acetylacetone made up in a hydrophobic fumed silica thickened (5%) cycloaliphatic epoxy matrix.

Composition 2(ii) contained, by weight of the composition, the following components:

2% diaryliodonium hexafluoroantimonate;

2% copper(II) naphthenate;

2% ascorbic acid palmitate and

2% acetylacetone made up in a hydrophobic fumed silica thickened (5%) cycloaliphatic epoxy matrix.

Composition 2(iii) contained, by weight of the composition, the following components:

2% diaryliodonium hexafluoroantimonate;

2% copper(II) naphthenate;

2% ascorbic acid palmitate;

2% acetylacetone and 0.1% TEMPO made up in a hydrophobic fumed silica thickened (5%) cycloaliphatic epoxy matrix.

(TEMPO is available from Aldrich Chemical Company, The Old Brickyard, New Road, Gillingham, Dorset SP8 4XT, England.)

The compositions were tested using the DSC method described in the General Experimental Procedure and the results are plotted in FIG. 2. As can be seen from FIG. 2 the heat flow in milliwatts is plotted against the storage time at the temperature indicated. Conmpositions 2(i) and 2(ii) were tested at 0° C. and 7° C. Composition 2(iii) was tested at 7° C.

These results indicate the stabilising effect of addition of acetylacetone which helps increase the onset temperature of the composition incurring the stability of the compositions.

Composition 2(ii) was tested for bonding strength using a push-off strength test by applying 0.1 mg amount to an epoxy glass Fr4 board (an epoxy glass circuit board available under this brand name from Irish Printed Circuits Ltd, Block B, Unit E, Ballymount Drive, Dublin 12, Ireland) and using it to bond a 1206 capacitor available from HB Electronics Ltd, Lever St, Bolton, BL3 6BS, United Kingdom to the board. The push-off test was conducted as follows:

(1) The epoxy glass circuit board is conditioned by heating to 120° C. for 30 minutes and then allowed to return to room temperature:

(2) An amount of the composition approximately 1 to 1.5 mm in diameter is applied to the circuit board;

(3) The capacitor was placed squarely onto the composition and pressed down firmly by manual pressure;

(4) The composition was heat cured at the temperature specified;

(5) About five to six minutes after curino is complete the capacitor/circuit board and a Chatillion gauge are arranged so that the Chatillion gauge is arranged to push off the capacitor in a direction 90° (transverse) to the circuit board. The amount of force required by the Chatillion gauge to push off the capacitor (i.e. break the bond between the capacitor and the circuit board) is recorded. The average of five results are taken for each composition.

Results for Example 2

The composition 2(ii) was found to be capable of sticking 1206 capacitors to an epoxy glass Fr4 board in 90 seconds when heat cured at 90° C. Push-off strengths in excess of 20 Newtons were achieved.

EXAMPLE 3

The following compositions, with the amounts of the components present given as percentages by weight based upon the total weight of the composition, were prepared according to the procedure described in the General Experimental Procedure:

3(i) 2% ascorbic acid palmitate, 2% diaryliodonium hexafluoroantimonate and 2% copper naphthenate in a 5% silica thickened cycloaliphatic epoxy matrix (control formulation);

3(ii) Composition 3(i) plus 2% acetylacetone;

3(iii) Composition 3(ii) plus 0.1% 1,4-naphthaquinone;

3(iv) Composition 3(ii) plus 0.1% TEMPO.

Results for Example 3

The addition to the control formulation [3(i)] of acetylacetone [3(ii)], of acetylacetone and 1,4-napthaquinone [3(iii)] and of acetylacetone and TEMPO [3(iv)] were all found to improve stability as compared against the control formulation. The stability data is given in FIG. 3.

The compositions were tested using the DSC method described above for onset cure temperature. The onset temperature of the control formulation [3(i)] was increased from 45° C. to 70° C. on addition of the acetylacetone [3(ii)], with the onset temperature increased to 85° C. to 90° C. on addition of the radical inhibitors 1,4-naphthaquinone and TEMPO, leading to a further increase in stability. This effect is illustrated in FIG. 3.

EXAMPLE 4

The following compositions, with the amounts of the components present given as percentages by weight based upon the total weight of the composition, were prepared according to the procedure described in the General Experimental Procedure:

4(i) 2% ascorbic acid palmitate, 2% diaryliodonium hexafluoroantimonate and 2% copper naphthenate in a 5% silica thickened cycloaliphatic epoxy matrix (control formulation);

4(ii) Composition 4(i) plus 2% benzoylacetone;

4(iii) Composition 4(ii) plus 0.1% 1,4-naphthaquinone;

4(iv) Composition 4(ii) plus 0.1% TEMPO.

Results for Example 4

The addition to the control formulation [4(i)] of benzoyl acetone [4(ii)], of benzoyl acetone and 1,4-napthaquinone [4(iii)] and of benzoyl acetone and TEMPO [4(iv)] were all found to improve stability as compared against the control formulation. The stability data is given in FIG. 4.

The compositions were tested using the DSC method described above for onset cure temperature and compositions 4(ii), 4(iii) and 4(iv) were found to have an increased onset cure temperature as compared to the control formulation 4(i). The onset temperature of the control formulation [4(i)] was increased from 45° C. to 75° C. on addition of the benzoyl acetone [4(ii)], with further increases in the onset temperature, as in Example 3 above, on addition of the radical inhibitors 1,4-naphthaquinone and TEMPO, leading to the observed increase in stability. This effect is seen from FIG. 4.

EXAMPLE 5

The following compositions, with the amounts of the components present given as percentages by weight based upon the total weight of the composition, were prepared according to the procedure described in the General Experimental Procedure:

5(i) 2% diaryliodonium hexafluoroantimonate and 2% copper naphthenate in a 5% silica thickened cycloaliphatic epoxy matrix (control formulation);

5(ii) Composition 5(i) plus 0.1% 1,4-naphthaquinone;

5(iii) Composition 5(i) plus 0.1% TEMPO.

The stability data is shown in FIG. 5.

In this case the addition of the radical stabilisers, 1,4-naphthaquinone and TEMPO, was found to reduce the onset temperature of the control formulation [5(i)] from 98° C. to 90° C. causing the observed decrease in stability, shown in FIG. 5. This contrasts with FIGS. 3 and 4 where the addition of TEMPO increased the onset temperature and the stability of the composition.

EXAMPLE 6

Composition 6(i) was prepared as described for composition 1(iii) and further included 0.013% w/w of Basic Red 29. The addition of the Basic Red 29 was sufficient to impart a desired colour to the composition without substantially affecting the stability of the composition as compared against composition 1(iii)—see FIG. 6.

What is claimed is:

1. A curable one-part epoxy-based composition comprising:
   a polymerizable cycloaliphatic epoxy compound; a diaryliodonium salt; a salt or complex of copper; and a nitroxyl free radical stabiliser; and optionally, an aromatic diketone.

2. A composition according claim 1, further comprising a β-diketone.

3. A composition according to any one of claims 1 or 2, further comprising an α-hydroxy ketone.

4. A composition comprising:
   a polymerizable cycloaliphatic epoxy compound;
   a diaryliodonium salt;
   a salt or complex of copper;
   an α-hydroxy ketone; and at least one member selected from the group consisting of:
      an aromatic diketone; a nitroxyl free radical stabilizer; and a β-diketone.

5. A composition comprising:
   a polymerizable cycloaliphatic epoxy compound;
   a diaryliodonium salt;
   a salt or complex of copper;
   a α-hydroxy ketone;
   an aromatic diketone;
   a nitroxyl free radical stabilizer; and
   a β-diketone.

6. A composition according to any one of claims 1, 4 or 5, further comprising a dye.

7. A composition according to any one of claims 1, 4 or 5, wherein the diaryl iodonium salt is bisdodecyliodonium hexafluoroantimonate.

8. A composition according to any one of claims 1, 4 or 5, wherein the salt or complex of copper is a member selected from the group consisting of copper napthenate, copper acetylacetonate, copper stearate and copper palmitate.

9. A composition according to any one of claims 1, 4 or 5, wherein the aromatic diketone is a naphthaquinone.

10. A composition according to any one of claims 1, 4, or 5, wherein the nitroxyl free radical stabilizer is 2,2,6,6-tetramethyl-piperidinyloxy (TEMPO).

11. A composition according to any one of claims 1, 4 or 5, wherein the β-diketone is a member selected from the group consisting of acetylacetone and benzoylacetone.

12. A composition according to any one of claims 1, 4 or 5, wherein the α-hydroxy ketone is a member selected from the group consisting of ascorbic acid and an ascorbic acid derivative.

13. A composition according to any one of claims 1, 4 or 5, wherein the cycloaliphatic epoxy compound is present in an amount from about 40% to about 95% w/w based on the total weight of the composition.

14. A composition according to any one of claims 1, 4 or 5, wherein the diaryliodonium salt is present in an amount from about 0.01% to about 10% w/w based on the total weight of the composition.

15. A composition according to any one of claims 1, 4 or 5, wherein the salt or complex of copper is present in an amount from about 1 to about 1,000 ppm.

16. A composition according to any one of claims 1, 4 or 5, wherein the aromatic diketone compound is present in an amount from about 0.01% to about 10% w/w based on the total weight of the composition.

17. A composition according to any one of claim 1, 4 or 5, wherein the nitroxyl free radical is present in an amount from about 1 part per million to about one percent by weight.

18. A composition according to any one of 4, 4 or 5, wherein the β-diketone is present in an amount from about 0.01% to about 10% w/w based on the total weight of the composition.

19. A composition according to any one of claims 4 or 5, wherein the α-hydroxy ketone is present in an amount from about 0.01% to about 10% w/w based on the total weight of the composition.

20. A composition according to claim 6, wherein the dye is present in an amount from about 0.5% to about 20% w/w based on the total weight of the composition.

21. A method of bonding an electronic component to a carrier substrate, comprising the steps of:
   dispensing onto an appropriate location on a carrier substrate a sufficient amount of a composition according to any one of claims 1, 4 or 5;
   positioning over the location bearing the composition an electronic component;
   mating the electronic component with the carrier substrate; and
   exposing the mated electronic component/carrier substrate assembly to conditions favorable to effect cure of the composition.

22. A method of underfilling a space between an electronic component and a carrier substrate, the electronic component being mounted on the carrier substrate, comprising the steps of:
   dispensing an amount of an epoxy composition according to any one of claims 1, 4 or 5 into the space between the electronic component and the carrier substrate; and
   eposing the epoxy composition to conditions favorable to effect cure.

23. A method of curing a composition according to any one of claims 1, 4 or 5, comprising the steps of:
   applying the composition to a substrate and
   exposing the applied composition to moving heated air to effect cure.

24. A method according to claim 23 wherein the composition reaches a temperature of about 80° C. or higher.

25. An assembly comprising a substrate with an electronic component attached thereto, the electronic component being attached to the substrate by a composition according to any one of claims 1, 4 or 5.

26. An assembly comprising a substrate with an electronic component attached thereto, a space between the electronic component and the substrate being filled by a composition according to any one of claims 1, 4 or 5 which has been cured.

27. A composition according to any one of claims 1, 4 or 5, wherein the aromatic diketone is present in an amount from about 0.1% to about 10% w/w based on the total weight of the composition; and the β-diketone is present in an amount from about 0.1% to about 10% w/w based on the total weight of the composition.

28. A composition according to claim 3, wherein the α-hydroxy ketone is present in an amount from about 0.1% to about 10% w/w based on the total weight of the composition; and the β-diketone is present in an amount from about 0.01% to about 10% w/w based on the total weight of the composition.

* * * * *

UNITED STATES PATENT AND TRADEMARK OFFICE
CERTIFICATE OF CORRECTION

PATENT NO. : 6,372,350 B1
DATED : April 16, 2002
INVENTOR(S) : Edward Scott et al.

It is certified that error appears in the above-identified patent and that said Letters Patent is hereby corrected as shown below:

Column 1,
Line 21, change "effect" to -- affect --
Line 67, change ";" to -- : --

Column 3,
Line 11, change "weigh" to -- weight --

Column 4,
Line 25, change "effect" to -- affect --

Column 15,
Line 13, after "agents" insert -- , --

Column 16,
Line 14, change "diaryllodonium hexatluoroantimonate" to -- diaryliodonium hexafluoroantimonate --

Column 17,
Line 24, change ":" to -- ; --
Line 32, change "curino" to -- curing --

Column 19,
Line 8, before "claim" insert -- to --
Line 26, change "a" to -- an --

UNITED STATES PATENT AND TRADEMARK OFFICE
CERTIFICATE OF CORRECTION

PATENT NO.    : 6,372,350 B1
DATED         : April 16, 2002
INVENTOR(S)   : Edward Scott et al.

It is certified that error appears in the above-identified patent and that said Letters Patent is hereby corrected as shown below:

Column 20,
Line 4, change "4, 4 or 5" to -- 1, 4 or 5 --
Lines 26, 36 and 41 change "effect" to -- affect --
Line 35, change "eposing" to -- exposing --

Signed and Sealed this

Twentieth Day of August, 2002

*Attest:*

*Attesting Officer*

JAMES E. ROGAN
*Director of the United States Patent and Trademark Office*